(12) United States Patent
Verbridge et al.

(10) Patent No.: US 11,940,022 B2
(45) Date of Patent: Mar. 26, 2024

(54) INTEGRATED DISCONNECT FOR DRIVE UNIT

(71) Applicant: Rivian IP Holdings, LLC, Irvine, CA (US)

(72) Inventors: Mason Verbridge, Canton, MI (US); George Zalanca, Windsor (CA); Cameron P. Williams, Dexter, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/866,308

(22) Filed: Jul. 15, 2022

(65) Prior Publication Data

US 2024/0019002 A1    Jan. 18, 2024

(51) Int. Cl.
| F16D 41/12 | (2006.01) |
| F16D 28/00 | (2006.01) |
| F16D 48/06 | (2006.01) |
| B60K 1/02  | (2006.01) |
| F16D 21/06 | (2006.01) |

(52) U.S. Cl.
CPC ........... *F16D 41/125* (2013.01); *F16D 28/00* (2013.01); *F16D 48/06* (2013.01); *F16D 48/064* (2013.01); *B60K 1/02* (2013.01); *F16D 21/06* (2013.01); *F16D 2021/0646* (2013.01)

(58) Field of Classification Search
CPC . F16D 41/18; F16D 41/185; F16D 2021/0646
See application file for complete search history.

(56) References Cited

U.S. PATENT DOCUMENTS

| 2,353,554 | A  | * | 7/1944  | Gates    | B62D 11/08   |
|           |    |   |         |          | 192/49       |
| 4,811,628 | A  | * | 3/1989  | Winkam   | F16H 48/08   |
|           |    |   |         |          | 475/86       |
| 5,133,696 | A  | * | 7/1992  | Kobayashi| F16H 48/30   |
|           |    |   |         |          | 192/106 F    |
| 5,168,953 | A  | * | 12/1992 | Naito    | B60K 23/04   |
|           |    |   |         |          | 701/88       |
| 5,279,401 | A  | * | 1/1994  | Stall    | F16H 63/3026 |
|           |    |   |         |          | 192/52.4     |
| 6,290,044 | B1 | * | 9/2001  | Burgman  | F16D 41/125  |
|           |    |   |         |          | 192/85.48    |
| 6,460,677 | B1 | * | 10/2002 | Roscoe   | F16H 48/34   |
|           |    |   |         |          | 192/93 A     |
| 6,620,072 | B1 | * | 9/2003  | Salg     | F16H 48/22   |
|           |    |   |         |          | 475/231      |
| 8,596,436 | B2 | * | 12/2013 | Grogg    | B60K 17/35   |
|           |    |   |         |          | 192/85.49    |
| 11,073,183| B2 | * | 7/2021  | Shioiri  | F16D 41/125  |
| 2002/0077212 | A1 | * | 6/2002 | Krisher | F16H 48/34   |
|           |    |   |         |          | 475/86       |

(Continued)

*Primary Examiner* — Stacey A Fluhart
(74) *Attorney, Agent, or Firm* — Haley Guiliano LLP

(57) ABSTRACT

Systems and methods are presented herein for providing an integrated disconnect. The integrated disconnect may be used within a drive unit. The integrated disconnect comprises an output gear having a cavity. A torque transfer adapter is arranged within the cavity. A clutch body is also arranged within the cavity. The clutch is actuatable through the output gear by an actuator to engage and disengage the clutch with the torque transfer adaptor. The actuator is located external to the cavity.

18 Claims, 9 Drawing Sheets

(56) References Cited

U.S. PATENT DOCUMENTS

| | | | |
|---|---|---|---|
| 2004/0241902 A1* | 12/2004 | Letertre | H01L 21/02664 |
| | | | 438/106 |
| 2005/0241902 A1* | 11/2005 | Cha | F16D 41/185 |
| | | | 192/46 |
| 2010/0240486 A1* | 9/2010 | Pritchard | F16H 48/30 |
| | | | 475/220 |
| 2010/0304930 A1* | 12/2010 | Poulin | B60W 10/18 |
| | | | 477/184 |
| 2013/0256078 A1* | 10/2013 | Kimes | F16D 11/14 |
| | | | 192/69 |
| 2017/0198798 A1* | 7/2017 | Ziech | B60K 17/3462 |
| 2020/0164736 A1 | 5/2020 | Verbridge et al. | |
| 2021/0262534 A1* | 8/2021 | Sakuyama | F16D 23/12 |
| 2021/0379977 A1 | 12/2021 | Williams et al. | |

\* cited by examiner

INTEGRATED DISCONNECT FOR DRIVE UNIT

INTRODUCTION

The present disclosure is directed to systems and methods for providing an integrated disconnect comprising a clutch assembly, and more particularly, to systems and methods that integrate components of the clutch assembly into a gear.

SUMMARY

Drive units are utilized to translate motion from a source of energy to a component which can utilize the energy from the source to perform a function or perform a form of work. Drive units can incorporate disconnect assemblies to differentiate torque outputs from the drive units. For example, drive units are utilized in some housings in vehicle axles to translate energy, produced by a powertrain assembly, to a pair of wheel of assemblies which may rotate in unison or separately depending on whether the disconnect is in a connected state or a disconnected state, respectively. Some drive units are configured to support torque vectoring in order to vary the torque transferred from the powertrain to each of a pair of half shafts that may be coupled to wheel assemblies on opposing sides of a vehicle. Depending on the application of the drive unit and the packaging of the vehicle, a drive unit configured to enable torque vectoring without compromising weight distribution or vehicle assembly packaging is advantageous.

In view of the foregoing, systems and methods are described herein for providing an integrated disconnect for a drive unit. In some embodiments, components of the integrated disconnect are integrated inside an output gear (e.g., within a cavity). In some embodiments, a torque transfer adapter and a clutch body are arranged within the cavity. The clutch body is actuatable through the output gear by an actuator located external to the cavity to engage and disengage the clutch body with the torque transfer adaptor.

In some embodiments, a housing is structured to enclose the output gear. A first bearing is arranged laterally displaced from the actuator within a groove in the housing and configured to stabilize rotational motion of the output gear. A second bearing arranged concentric to a flange on a cover plate affixed to an opening in the output gear that is laterally displaced from the cavity opposite of the groove in the housing. The actuator is arranged external to the output gear and configured to actuate the clutch body into an engaged position.

In some embodiments, the clutch body comprises at least one feature configured to interface with the torque transfer adapter when the clutch body is translated into an engaged position. In some embodiments, the torque transfer adapter is configured to receive at least one feature from the clutch body when the clutch body is translated into an engaged position.

In some embodiments, a solenoid is coupled to the clutch body and the solenoid is configured to translate the clutch body to at least one of an engaged position and a disengaged position relative to the torque transfer adapter.

In some embodiments, the integrated disconnect comprises a sensor arranged external to the output gear and communicably coupled to the actuator. At least a portion of the actuator interfaces with the clutch body such that the sensor is communicably coupled to the portion of the actuator that interfaces with the clutch body enabling the sensor to detect a position of the clutch body within the cavity.

In some embodiments, the integrated disconnect comprises a sensor arranged to detect a position of the clutch body within the cavity relative to the torque transfer adapter, wherein the sensor is communicably coupled to a communication network configured to transmit data associated with the position of the clutch body.

In some embodiments, the integrated disconnect comprises a clutch body that is coupled to an actuator, wherein the actuator comprises a solenoid configured to modify the clutch body position to an engaged position such that the clutch body is interfacing with the torque transfer adapter. A return mechanism is affixed to the clutch body such that the return mechanism is configured to modify the clutch body position to a disengaged position such that the clutch body is separate from the torque transfer adapter.

In some embodiments, a vehicle powertrain, comprising a motor and a drive unit coupled to the motor, incorporates the integrated disconnect. A housing is configured to accommodate a first bearing and a second bearing, wherein each of the first bearing and the second bearing are configured to stabilize rotational motion of the output gear. An actuator or solenoid is arranged external to the output gear and configured to actuate the clutch body into an engaged position. In some embodiments, a sensor is arranged to detect a position of the clutch body within the cavity relative to the torque transfer adapter, wherein the sensor is communicably coupled to a communication network configured to transmit data associated with the position of the clutch body.

In some embodiments, the integrated disconnect comprises a first output gear having a first cavity and a first torque transfer adapter arranged within the first cavity. A second output gear having a second cavity is arranged such that the second cavity opposes the first cavity, and a second torque transfer adapter is arranged within the second cavity. A clutch assembly is arranged between the first torque transfer adapter and the second torque transfer adapter, wherein the clutch assembly is configured to actuate a clutch body through the first output gear and the second output gear, separately or simultaneously, based on instructions transmitted to an actuator affixed to the clutch assembly.

In some embodiments, a housing is structured to enclose the first output gear, the second output gear, and at least a portion of the actuator. A first bearing is arranged in a first groove in the housing and the first bearing is configured to stabilize rotational motion of the first output gear. A second bearing is arranged in a second groove in the housing and the second bearing is configured to stabilize rotational motion of the second output gear. A third bearing is arranged between the first output gear and the second output gear such that the third bearing stabilizes relative rotational motion within the housing of first output gear and the second output gear. The actuator is arranged such that a majority of the actuator is external to the housing, wherein the actuator is configured to translate the first torque transfer adapter to a first engaged position, and wherein the actuator is further configured to translate the second torque transfer adapter to a second engaged position.

In some embodiments, the clutch assembly comprises a first feature configured to interface with the first torque transfer adapter and a second feature configured to interface with the second torque transfer adapter.

In some embodiments, the first torque transfer adapter is configured to receive a first feature from the clutch assembly when the clutch assembly is actuated to move the first torque transfer adapter into a first engaged position. Additionally, the second torque transfer adapter is configured to receive a second feature from the clutch assembly when the clutch assembly is actuated to move the first torque transfer adapter into a second engaged position.

In some embodiments, the first sensor is arranged external to the first output gear and communicably coupled to the actuator. Additionally, a second sensor is arranged external to the second output gear and communicably coupled to the actuator. At least a portion of the actuator interfaces with the clutch assembly such that the first sensor and the second sensor are communicably coupled to the portion of the actuator that interfaces with the clutch assembly. This enables the first sensor and the second sensor to detect a position of the clutch assembly within the cavity relative to the first torque transfer adapter and the second torque transfer adapter.

In some embodiments, the clutch assembly comprises a first extension affixed to the actuator at a first end, affixed to the first torque transfer adapter at a second end, and communicably coupled to a first sensor, and a second extension affixed to the actuator at a third end, affixed to the second torque transfer adapter at a fourth end, and communicably coupled to a second sensor. A processor is configured to receive data transmitted from the first sensor and the second sensor and convert the data transmitted into a position status for each of the first extension and the second extension.

In some embodiments, the actuator comprises a solenoid configured to modify the clutch assembly position to a first engaged position with between a first portion of the clutch assembly and the first torque transfer adapter. The solenoid is further configured to modify the clutch assembly position to a second engaged position between a second portion of the clutch assembly and the second torque transfer adapter. A return mechanism is affixed to the clutch assembly such that the return mechanism is configured to modify a current clutch assembly position to a disengaged position such that the clutch assembly is separate from both the first torque transfer adapter and the second torque transfer adapter.

In some embodiments, a method is implemented for regulating the output of a drive unit. The method comprises detecting a first torque output of at least one torque transfer adapter and receiving a command to modify the torque output of the at least one torque transfer adapter. An instruction is transmitted to an actuator coupled to a clutch assembly that provides information to the actuator to modify the position of the clutch assembly to engage the at least one torque transfer adapter. The actuator receives the instruction and in response to receiving the instruction at the actuator, the clutch assembly position is modified via the actuator such that the clutch engages the at least one torque transfer adapter, yielding a second torque output.

In some embodiments, the method comprises providing a gear configured to interface with an input shaft, wherein the gear comprises the cavity configured to accommodate the torque transfer adapter, and wherein a surface of the gear comprises a through opening to enable translation of at least a portion of the locking mechanism through the gear to interface with the torque transfer adapter. A housing encloses the gear, the torque transfer adapter, and at least a portion of the actuator. At least one bearing is arranged to stabilize rotational motion of the gear, wherein the at least one bearing is embedded in a groove in the housing.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for an integrated disconnect comprising an integrated clutch. Disconnects comprising modular assemblies result in redundancies in mass and assembly complexity. Additionally, modular disconnect assemblies can result in power loss as a result of additional interfaces leading to additional contact points preventing uniform translation of input forces to output forces. An integrated clutch, or integrated clutch assembly, reduces the overall mass of an integrated disconnect assembly due to a reduced number of components which share interfaces present in the integrated disconnect assembly regardless of whether a clutch or clutch assembly is present. Additionally, the integration of disconnect components (e.g., a clutch, a clutch assembly, or subcomponents thereof) into other components such as an output gear reduces the overall size and enables, for example, longer half shafts which increase the durability of the half shaft as well as the allowable suspension articulation of the vehicle suspension connected to the integrated disconnect.

In some embodiments, a drive unit architecture aligns two or more motors on different axes. Electrical and/or mechanical means may be used to "turn off" or otherwise disengage one or more drive units, and reduce associated losses (e.g., frictional losses). This is accomplished by incorporating one or more integrated disconnects into a drive unit assembly in order to engage or disengage output gears configured to translate rotational motion from a motor to a road wheel, for example. In some embodiments, a drive unit may include one or more electric motors configured to achieve torque vectoring (e.g., a two- or four-motor architecture) by use of an integrated disconnect with a clutch body configured to engage or disengage different output gears associated with different wheels. For example, a Front Drive Unit (FDU) and a Rear Drive Unit (RDU) may be included, and each may include two inverter cores, two motors, and two independent gearsets, wherein each gearset incorporates an integrated disconnect to achieve different outputs to the road wheels coupled to the gearsets.

Figure 1:
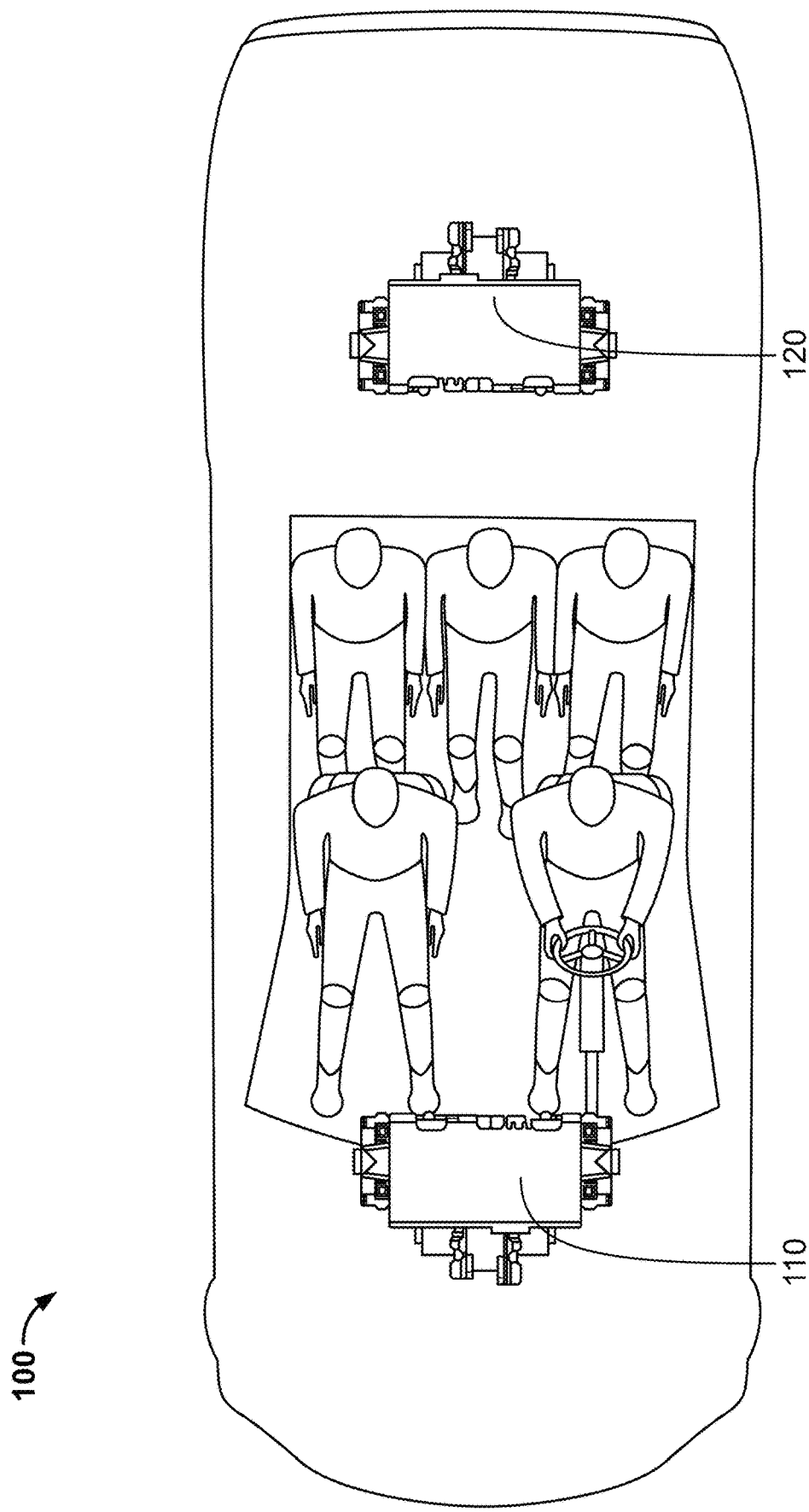
FIG. 1 shows a top view of illustrative components of a vehicle, in accordance with some embodiments of the disclosure.

FIG. 1 shows a top view of illustrative components of vehicle 100, in accordance with some embodiments of the disclosure. In some embodiments, a vehicle may include two or more electric motors, arranged in one or more drive units. For example, some of the motor assemblies may be identical, while some may have different handedness or shaft rotation direction relative to the motor. As illustrated, front drive unit 110 and rear drive unit 120 are oriented differently. The components and orientation of front drive unit 110 and rear drive unit 120 may be the same or different to accommodate suitable shaft rotations and fitment within the vehicle. Motors may interface with either or both of front drive unit 110 (e.g., along with other components such as an integrated disconnect, intermediate housing, bearings, etc.) and rear drive unit 120 (e.g., along with other components such as an integrated disconnect, intermediate housing, bearings, etc.).

Front drive unit 110 and rear drive unit 120 may each include an integrated disconnect including at least one of a clutch, a clutch assembly, and a clutch body in order to control the number of output shafts driven (e.g., controlling which wheels connected to drive shafts coupled to the integrated disconnects are to convert rotational motion from a powertrain to rotational motion of road wheels). For example, the integrated disconnects of the present disclosure may be applied at the front wheels, rear wheels, or both. To illustrate, at each drive axis (e.g., front and rear), either zero, one, or two motors may be used to provide torque to wheels of the drive axis. For example, in some circumstances, only the front drive axis may be powered (e.g., one or both motors), and the rear drive axis may be neutralized (e.g., non-powered and allowed to freewheel). In a further example, in some circumstances, both the front drive axis and the rear drive axis may be powered (e.g., one or both motors at each axis). In some embodiments, only one of front drive unit 110 and rear drive unit 120 include an integrated disconnect. For each of the drive units shown, an integrated disconnect may be coupled to each drive unit for individual locking and unlocking of each wheel (e.g., one to four integrated disconnects may be incorporated into an assembly configured to control the rotation motion of four wheels separately).

Figure 2:
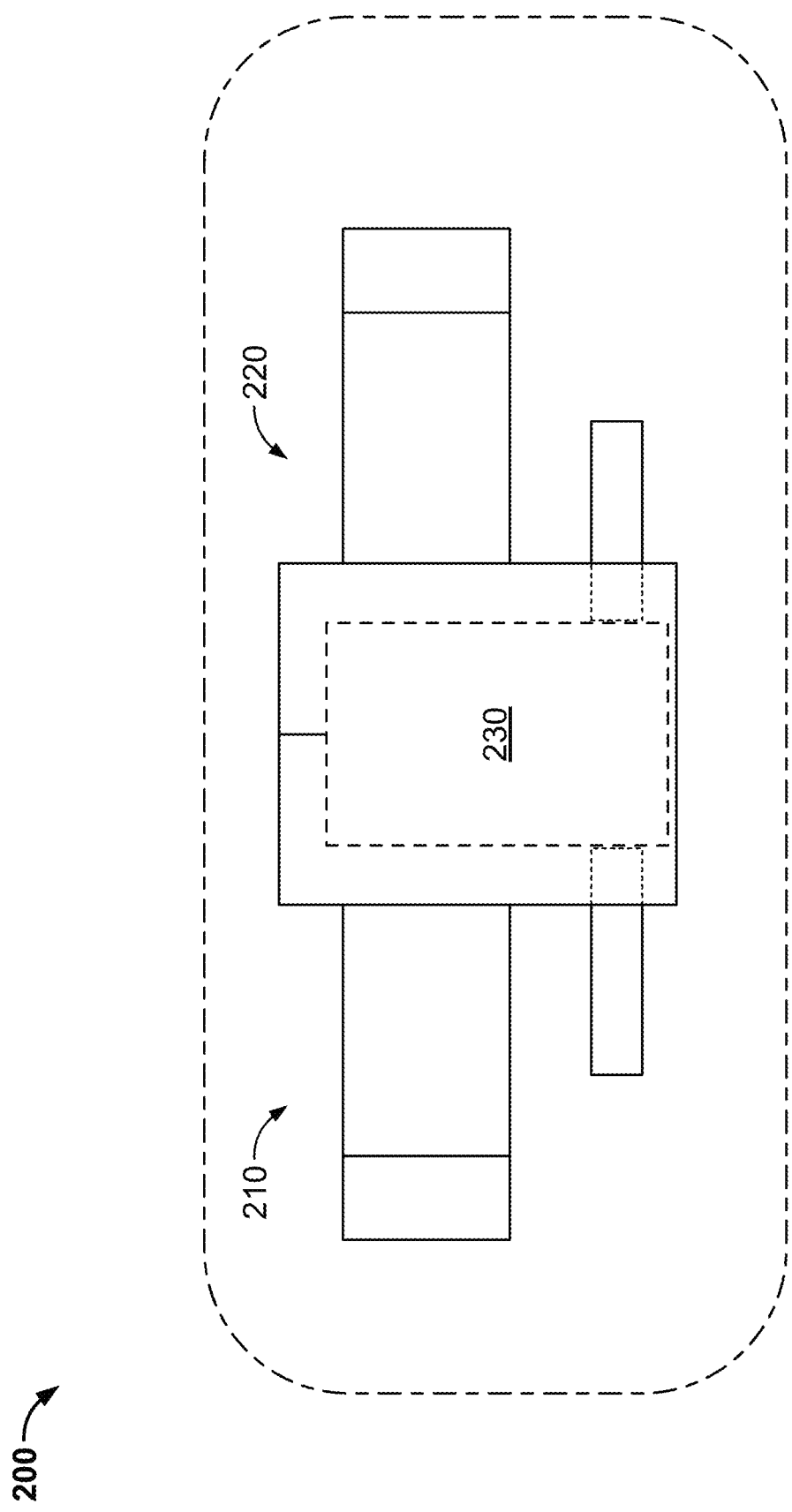
FIG. 2 shows an illustrative drive unit configuration, in accordance with some embodiments of the disclosure.

FIG. 2 shows drive unit configuration 200, in accordance with some embodiments of the disclosure. Configuration 200 includes two separate motor drives 210 and 220, each including a motor, gearbox (e.g., a housing or a housing), and output (e.g., an output spline or output half-shaft). Integrated disconnect 230 is installed and configured to couple or decouple the output of motor drives 210 and 220. The housings of motor drives 210 and 220 interface to each other to form a stationary housing. In some embodiments, integrated disconnect 230 may comprise one or more clutches configured to engage and disengage output gears associated with each of motor drives 210 and 220. In some embodiments, integrated disconnect 230 may be configured to engage or disengage each of motor drives 210 and 220 independently or simultaneously.

Figure 3:
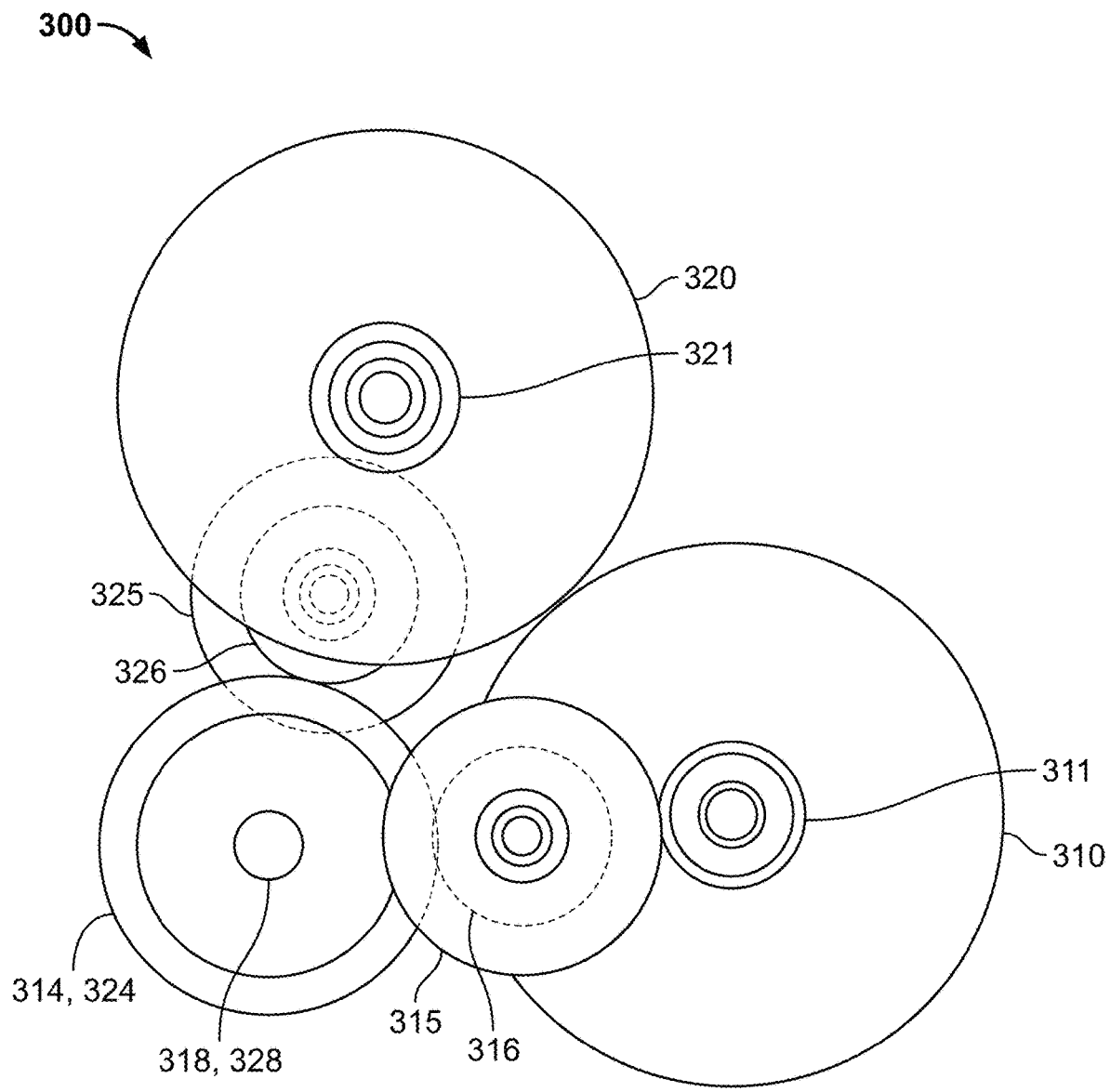
FIG. 3 shows an illustrative arrangement of gears within gearboxes, in accordance with some embodiments of the disclosure.

FIG. 3 shows arrangement 300 of gears within gearboxes, in accordance with some embodiments of the disclosure. Gearbox housings are not illustrated in FIG. 3 for clarity. Power train mechanisms, such as gearboxes, can assume various configurations and arrangements based on, for example, design constraints. For example, as illustrated in FIG. 3, the motors and intermediate gears are offset from each other for purposes of illustration and clarity. The motors, output gears, or both, may be aligned on respective axes, in accordance with the present disclosure (e.g., first gears 311 and 321 may be centered about the same axis). To illustrate, the offset arrangement of FIG. 3 allows each power transfer mechanism to be illustrated (e.g., illustrated as a "V", however the minor angle of the "V" may be zero degrees to form a motor-aligned arrangement). Each of the output gears depicted may incorporate one or more integrated disconnect to regulate whether the output gears translate rotational motion from a powertrain assembly to one or more drive units coupled to each of the output gears.

As illustrated in FIG. 3, each gearset (e.g., gears 311, 315, 316, and 314 are one gearset, and gears 321, 325, 326, and 324 are another gearset) includes a double reduction gear. Each motor (e.g., motor 310 and motor 320), includes a motor shaft having a first gear. For example, first gear 311 is affixed to the shaft of motor 310, and first gear 321 is affixed to the shaft of motor 320. Each first gear pairs with a larger of two intermediate gears that rotate about an intermediate axis. For example, first gear 311 engages with intermediate gear 315 affixed to an intermediate shaft. Intermediate gear 316, coupled to the same intermediate shaft as intermediate gear 315 engages with respective output gear 314 (e.g., coupled to a respective output shaft 318). Further, first gear 321 engages with intermediate gear 325 affixed to an intermediate shaft. Intermediate gear 326, coupled to the same intermediate shaft as intermediate gear 325 engages with respective output gear 324 (e.g., coupled to a respective output shaft 328, aligned with output shaft 318). It will be understood that, as illustrated in FIG. 3, output gears 314 and 324 are aligned, with output gear 324 being positioned behind output gear 314, and only output shaft 318 visible.

As illustrated, two reduction stages are included using three total gears, however a gear set may include two gears, three gears, or more than three gears, for example. In some embodiments, a power transfer mechanism (e.g., gearset of FIG. 3) is configured to reduce a rotation rate of an output shaft (e.g., an output shaft) relative to a rotation rate of a motor shaft. As used herein, a power transfer mechanism may refer to one or more components for transmitting shaft work among shafts. For example, a power transfer mechanism may include a gearset (e.g., a plurality of gears, each engaged with at least one other gear), a single gear (e.g., engaged with other gears such as an input gear and an output gear), bearings, any other suitable components, or any combination thereof. For example, the set of a motor gear, an intermediate gear, and an output gear may be referred to as a power transfer mechanism, or the intermediate gear alone may be referred to as a power transfer mechanism.

Figure 4:
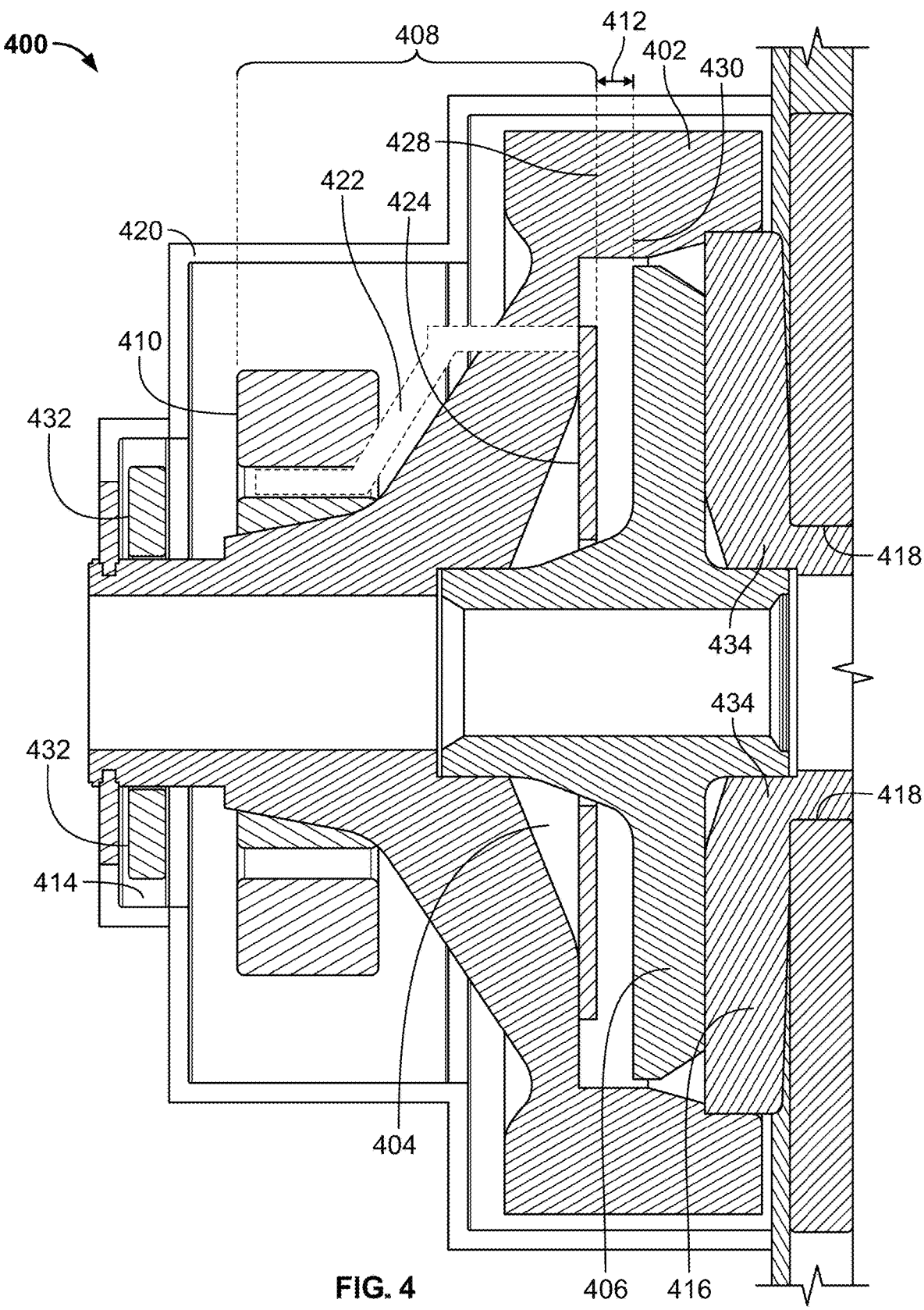
FIG. 4 shows a cross-sectional view of an illustrative integrated disconnect, in accordance with some embodiments of the disclosure.

FIG. 4 shows a cross-sectional view of integrated disconnect 400, in accordance with some embodiments of the disclosure. Integrated disconnect 400 comprises output gear 402. Output gear 402 comprises cavity 404. Cavity 404 is structured to accommodate torque transfer adapter 406 and at least a portion of clutch 408. Torque transfer adapter 406 is arranged within cavity 404 and is configured to receive a half shaft (e.g., a half shaft as part of a wheel drivetrain assembly as used in vehicle 100 of FIG. 1). Torque transfer adapter 406 is secured within cavity 404 by cover plate 416 which is fixedly attached to output gear 402 (e.g., the interface between cover plate 416 and output gear 402 may comprise complementing threads, a layer of adhesive, pins, and/or fasteners). Actuator 410 is arranged external to output gear 402 and is coupled to clutch 408. Actuator 410 may comprise a solenoid and clutch 408 may comprise at least one extension, such as clutch arm 422. Clutch arm 422 is configured to translate in response to a force input from actuator 410 and extends through the side of output gear 402, becoming affixed at one end to clutch body 424, which is arranged within cavity 404. As shown in FIG. 4, clutch body path 412 comprises disengaged position 428, wherein clutch body 424 does not contact or interface with a surface or feature of torque transfer adapter 406. Additionally, clutch body path 412 comprises engaged position 430, wherein clutch body 424 contacts or interfaces with the surface or at least one feature of torque transfer adapter 430.

Housing 420 encases, or houses, output gear 402 as well as the components of integrated disconnect 400 that interface with output gear 402. First bearing 432 is embedded in groove 414 within housing 420, wherein groove 414 is laterally displaced from cover plate 416. First bearing 432 is configured to stabilize the rotation of output gear 402. Positioned along a same central rotational axis, and laterally displaced inboard of first bearing 432 is solenoid 410. Solenoid 410 is arranged external to output gear 402 and is affixed to a portion of clutch 408 (e.g., affixed to output gear 402 and coupled to clutch arm 422). Solenoid 414 is configured to translate clutch 408 such that at least a portion of clutch 408 interfaces (e.g., contacts or engages) with features (e.g., threads, tabs, or extensions) of torque transfer adapter 406. Second bearing 418 is affixed to an outer surface of a portion of cover plate 416 and is configured to stabilize the rotation of output gear 402. Second bearing 418 is affixed to flange 434 of cover plate 416 by at least one of a press fit, an adhesive layer, and/or a threaded interface.

Figure 5:
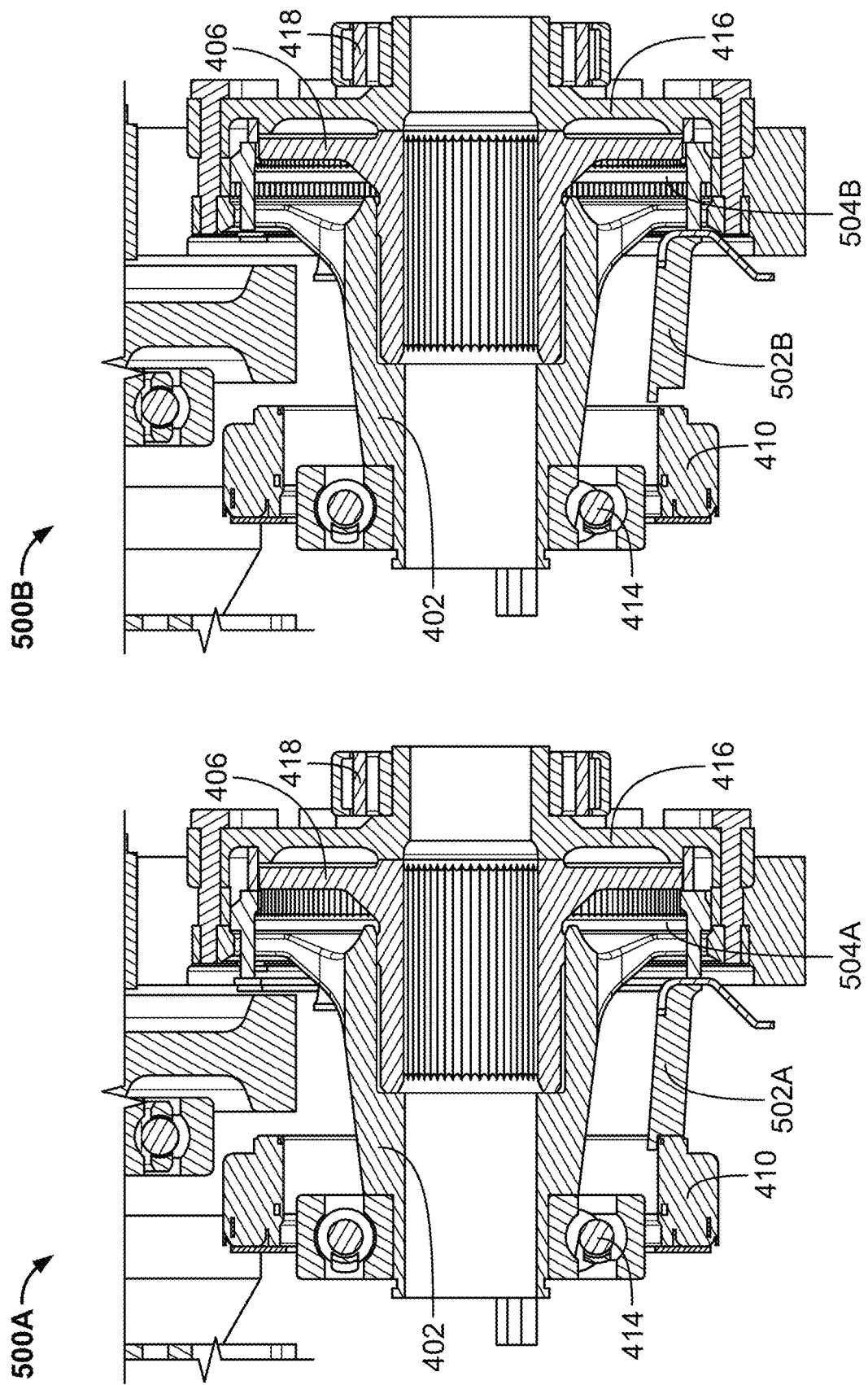
FIG. 5 shows a pair of cross-sectional views of an illustrative integrated disconnect with different clutch positions, in accordance with some embodiments of the disclosure.

FIG. 5 shows clutch disengaged position cross-sectional view 500A and clutch engaged position cross-sectional view 500B of an illustrative integrated disconnect in two different clutch positions, in accordance with some embodiments of the disclosure. FIG. 5 comprises the components of integrated disconnect 400 of FIG. 4 (e.g., output gear 402 and actuator 410). First bearing 432, inboard bearing 418, and cover plate 416 correspond to the same components of FIG. 4. Clutch disengaged position cross-sectional view 500A depicts clutch body 504A laterally displaced (i.e., disengaged) from torque transfer adapter 406. Clutch body 504A is coupled to clutch arm 502A. Clutch arm 502A interfaces with solenoid 410. Solenoid 410 is configured to generate a force to translate clutch arm 502A, thereby translating clutch body 504A, through output gear 402 to create contact between clutch body 504A and torque transfer adapter 406. In some embodiments, a return mechanism (e.g., a spring) is coupled to either clutch arm 502A, clutch body 504A, or both, in order to displace clutch body 504A away from torque transfer adapter 406 and return clutch body 504A to the position depicted in clutch disengaged position cross-sectional view 500A.

Clutch engaged position cross-sectional view 500B depicts clutch body 504B interfacing with (i.e., engaged) with torque transfer adapter 406 after being laterally displaced clutch arm 502A in response to a force from solenoid 410. In some embodiments, clutch body 504A and clutch body 504B comprise features configured to interface with complementing features on a contact surface of torque transfer adapter 406. For example, the features may comprise gear teeth, tabs, or extensions which are received by complementing teeth, slots, or recesses, respectively.

Figure 6:
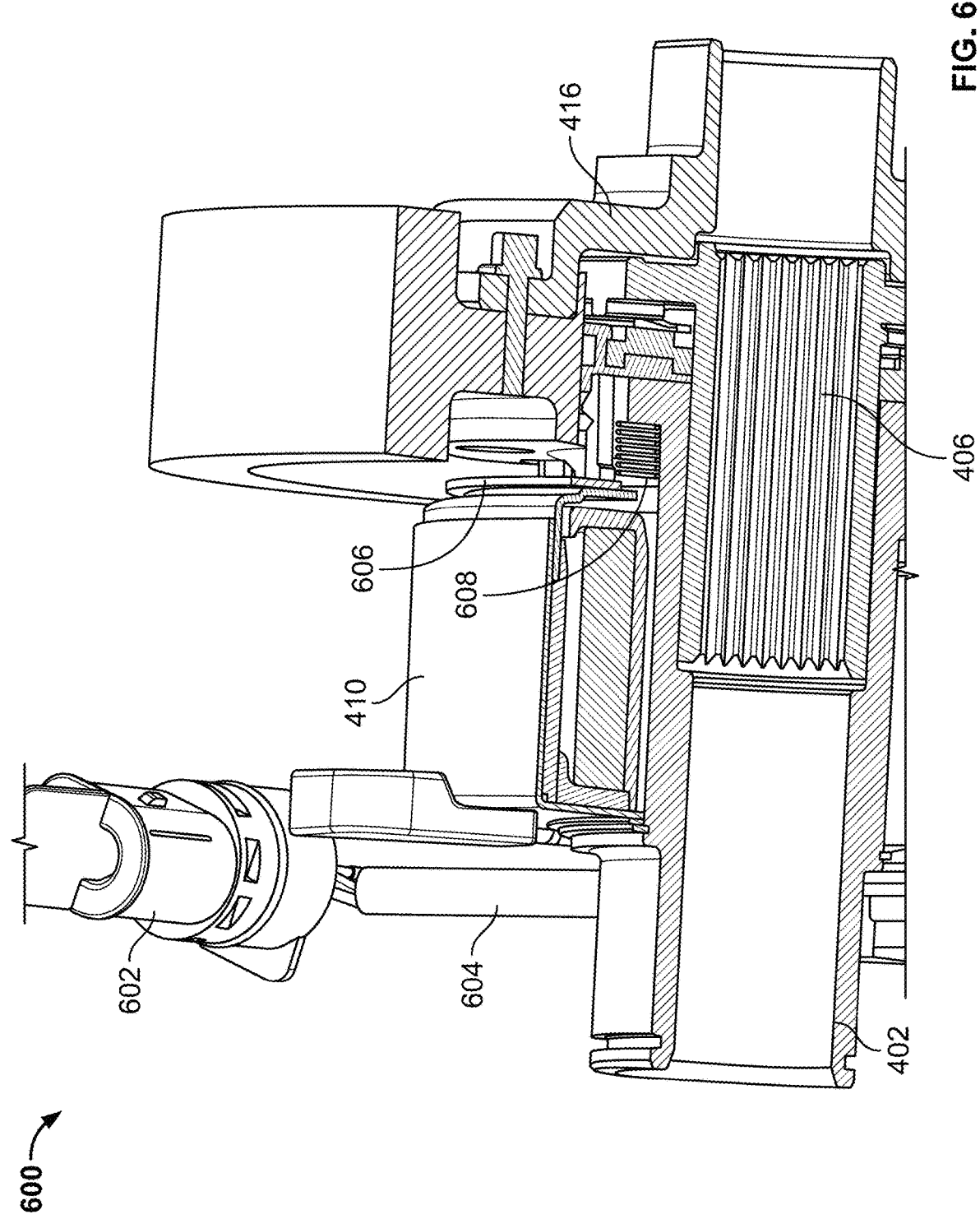
FIG. 6 shows a view of a sensor coupled to an illustrative integrated disconnect, in accordance with some embodiments of the disclosure.

FIG. 6 shows view 600 of sensor 602 coupled to an illustrative integrated disconnect, depicted with a cross sectional view, comprising components depicted in FIGS. 4 and 5, in accordance with some embodiments of the disclosure. Sensor 602 is arranged external to output gear 402 and is communicably coupled to signal transmission lines via cable 604. The signal transmission lines, accessible via cable 604, are connected to a vehicle communication network in which an illustrative integrated disconnect, comprising sensor 602, is arranged. Cable 604 is also coupled with actuator 402 (e.g., a solenoid) which is coupled to clutch body 606. Clutch body 606 is configured to be actuated through output gear 402 via actuator 410. Cables 604 are configured transmit data based on the status (e.g., position, functionality, active or inactive) of at least one of actuator 410 and clutch body 606. In some embodiments, clutch body 606 may be comprised of elements shown in FIG. 5, corresponding to clutch body 504A and clutch body 504B, as well as clutch 408 of FIG. 4. Return mechanism 608 is shown as being coupled to clutch body 606. In some embodiments, actuator 410 is configured to displace clutch body 606 into an engaged position wherein clutch body 606 contacts a surface of torque transfer adapter 406 while return mechanism 608 is configured to return clutch body 606 to a disengaged position when actuator 410 is inactive, based on signals transmitted through cable 604. For example, return mechanism 608 may comprise a tension spring configured to elongate in response to clutch body 606 translating towards a surface or feature of torque transfer adapter 406 based on a force input from actuator 410. In some embodiments, return mechanism 608 comprises a compression spring configured to return clutch body 606 to a disengaged state after being compressed by a force initiated by actuator 410 to translate clutch body 606 into an engaged position.

Once the force input from actuator 410 is removed (e.g., actuator 410 is off), return mechanism 608 then returns to an at rest compressed position, when configured as a tension spring, returning clutch body 606 to a disengaged position (e.g., as shown in FIGS. 4 and 5). In some embodiments, return mechanism 608 comprises a reversing of the polarity in a solenoid comprising actuator 410 such that the solenoid and translate clutch body from an engaged position back to a disengaged position. In some embodiments, return mechanism 608 may be positioned between the interior of cavity 404 of FIG. 4 and a surface of clutch body 606, arranged concentric to torque transfer adapter 406. In some embodiments, return mechanism 608 may be arranged external, partially or in its entirety, to torque output gear 402. Cover plate 416 abuts torque transfer adapter 406.

Figure 7:
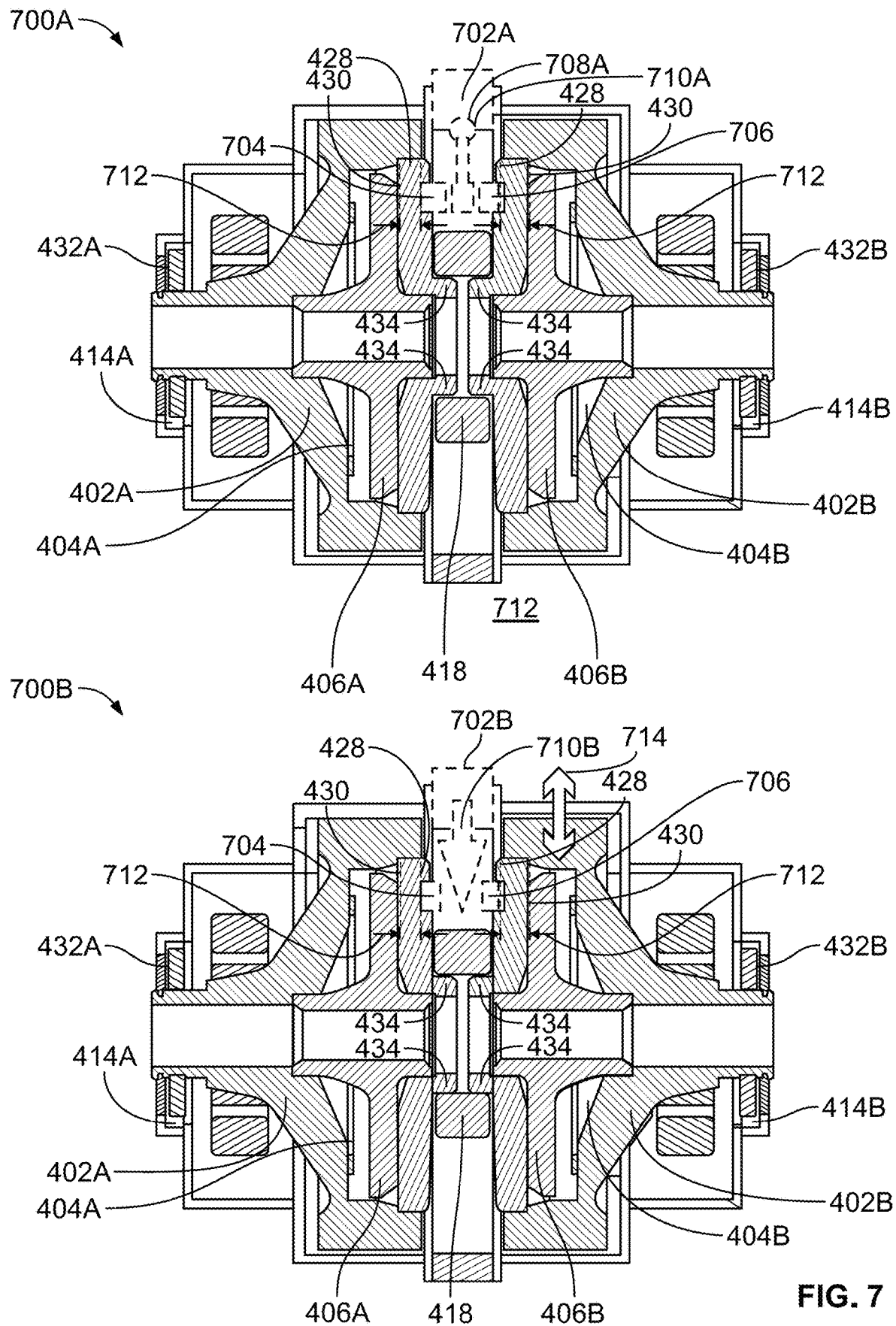
FIG. 7 shows a pair of cross-sectional views of a pair of illustrative integrated disconnects with different clutch assemblies, in accordance with some embodiments of the disclosure.

FIG. 7 shows independent center clutch 700A and dual center clutch 700B of a pair of illustrative integrated disconnects with different clutch assemblies, in accordance with some embodiments of the disclosure. Each of center clutch 700A and 700B comprise a respective integrated disconnect assembly comprising a respective first output gear 402A, a respective second output gear 402B, a respective first torque transfer adapter 406A, and a respective second torque transfer adapter 406B. Additional components depicted in FIG. 7 correspond to the various components depicted in FIGS. 4-6. Each of first torque transfer adapter 406A and second torque transfer adapter 406B are arranged in first cavity 404A and second cavity 404B in each of first output gear 402A and second output gear 402B, respectively. Each of center clutch 700A and 700B further comprise a respective first bearing 432A and 432B each arranged in first groove 414A and 414B, respectively, and a respective second bearing 418 each arranged about flanges 434 of each of cover plates 418A and 418B.

In some embodiments, improved efficiency may be achieved by nested bearings. For example, a central bearing may be positioned between a pair of torque transfer adapters and a pair of bearings may be incorporated into an integrated disconnect housing concentric to drive shafts or half shafts configured to interface with respective output gears that are coupled to each of the pair of torque transfer adapters. The nested bearings of the integrated disconnect reduce the need for additional bearings or seals throughout the housing to regulate and stabilize rotational motion of interfacing components. Additionally, an integrated disconnect allows for a larger length to diameter ratio of half shafts interfacing with the output gears to allow optimal control of joints associated with the drive shafts coupled to the half shafts (e.g., the ratio may be ~2.5:1 as opposed to a ratio closer to 1:1). The larger length to diameter ratio also reduces wear and inefficient movement of components in the assembly which would otherwise create loses and additional friction.

Independent center clutch 700A comprises actuator 702A, which may comprise a solenoid. First feature 704 corresponds to a feature configured to interface with a portion of torque transfer adapter 406A. For example, first feature 704 may comprise and extension configured to interface with a slot on torque transfer adapter 406A. As shown in independent center clutch 700A, first feature 704 corresponds to disengaged position 428 and is configured to be translated to engaged position 430 based on an input from actuator 702A which moves clutch body 710A about clutch pivot 708A in order to contact one of first feature 704 and second feature 706, which is configured to interface with torque transfer adapter 406B. Each of first feature 704 and second feature 706 are configured to translate about clutch feature path 712, which is bound by disengaged position 428 and engaged position 430. In some embodiments, each of first feature 704 and second feature 706 are returned to disengaged position 428 by a return mechanism, which may comprise a direction change caused by actuator 702A. IN some embodiments, the translation of first feature 704 and second feature 706 may be simultaneous or independent of each other.

Dual center clutch 700B comprises actuator 702B, which may comprise a solenoid. First feature 704 corresponds to a feature configured to interface with a portion of torque transfer adapter 406A, as described in reference to center clutch cross-sectional view 700A. As shown in dual center clutch 700B, first feature 704 corresponds to disengaged position 428 and is configured to be translated to engaged position 430 based on an input from actuator 702B which moves clutch body 710B along clutch body translation path 714. When clutch body 710B is actuated or extended to a position where clutch body 710 contacts each of first feature 704 and second feature 706, each feature will translate about clutch feature path 712 simultaneously such that each of first feature 704 and second feature 706 interface or contact each of torque transfer adapter 406A and 406B, respectively. Each of first feature 704 and second feature 706B have travel paths bound by disengaged position 428 and engaged position 430. In some embodiments, each of first feature 704 and second feature 706 are returned to disengaged position 428 by a return mechanism, which may comprise a direction change caused by actuator 702B (e.g., a spring coupled to each of first feature 704 and second feature 706 configured to extend post compression when clutch body 710B is translated vertically away from first feature 704 and second feature 706. The translation of first feature 704 and second feature 706 may be simultaneous.

Figure 8:
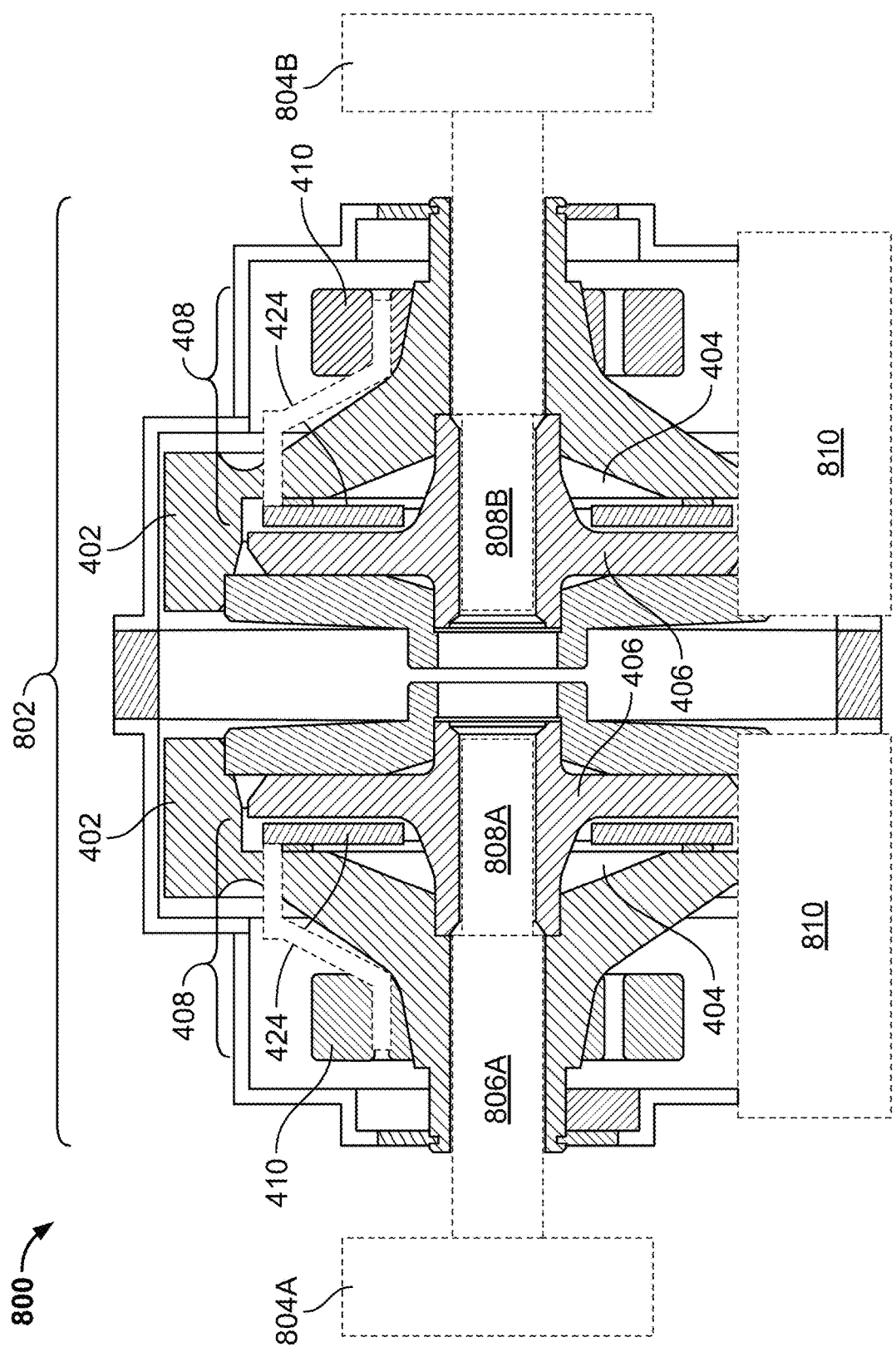
FIG. 8 shows a cross-sectional view of an illustrative integrated disconnect arranged in a drive unit assembly, in accordance with some embodiments of the disclosure.

FIG. 8 shows cross-sectional view 800 of drive unit assembly 802 comprising a pair of integrated disconnects 400 of FIG. 4 in accordance with some embodiments of the disclosure. Each of the components of FIG. 4 are duplicated in each of integrated disconnects 400 shown in drive unit assembly 802. Drive unit assembly 802 may comprise any or all of the components shown in FIGS. 4-7. Positioned on either side of drive unit assembly 802 are wheels 804A and 804B, corresponding to a single axel of a set of wheels of a vehicle as described in reference to FIG. 1. Affixed to each of wheels 804A and 804B are drive shafts 806A and 806B, respectively. On the ends of each of drive shafts 806A and 806B are half shafts 808A and 808B. Each of half shafts 808A and 808B interfaces with an internal surface of torque transfer adapters 406. The interface may be achieved by a spline. Once the interface is connected, the rotational motion of torque transfer adapters 406 may be transferred to each of wheels 804A and 804B via each of half shafts 808A and 808B through drive shafts 806A and 806B. In some embodiments, each of torque transfer adapters 406 is arranged to have at least an edge submerged in oil reservoirs 810 in order to circulate lubrication throughout drive unit assembly 802.

Figure 9:
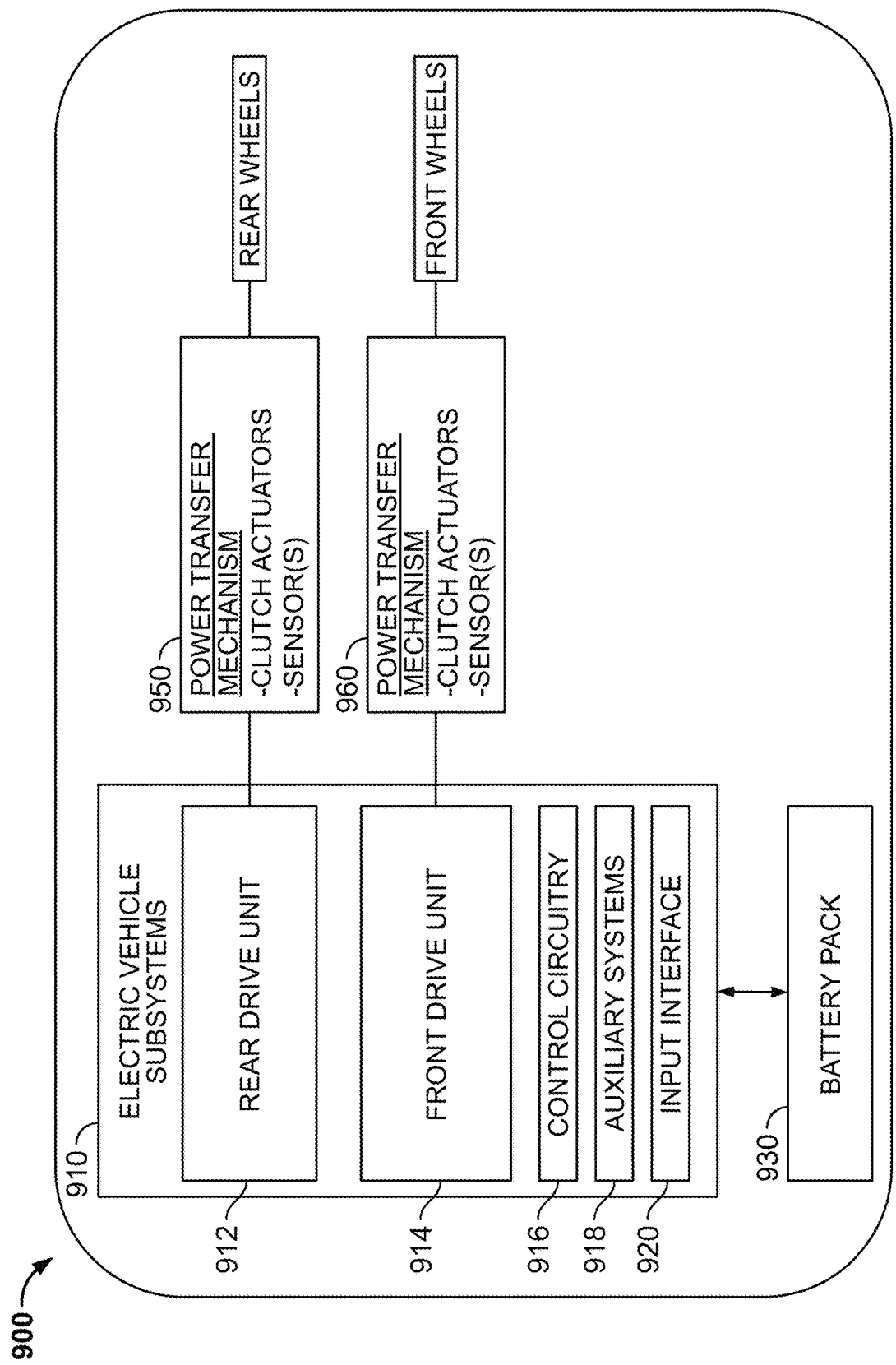
FIG. 9 shows a block diagram of a vehicle system having an integrated disconnect, in accordance with some embodiments of the disclosure.

FIG. 9 depicts vehicle system 900, which is a block diagram of a vehicle system having an integrated disconnect, in accordance with some embodiments of the disclosure. Electric vehicle 900 includes battery pack 930, electric vehicle subsystems 910, suspension, and wheels. Electrical vehicle subsystems 910 includes, for example, rear drive unit 912, front drive unit 914, control circuitry 916, auxiliary systems 918, input interface 920, and any other suitable corresponding equipment. Electric vehicle 900 includes power transfer mechanism 950 (e.g., a gearbox, pulley system, or other mechanism for transferring shaft work) corresponding to one drive axis (e.g., rear drive axis) and power transfer mechanism 960 corresponding to another drive axis (e.g., front drive axis). Electric vehicle 900 may be the same as electric vehicle 100 of FIG. 1, for example, wherein front drive unit 110 and rear drive unit 120 correspond to power transfer mechanisms 960 and 950, respectively. In a further example, vehicle 900 may include any of the illustrative arrangements of FIGS. 1-8 as part of either or both of power transfer mechanisms 950 and 960. Vehicle subsystems 910 may be used to, for example, monitor operation (e.g., sensor signals) of any of the illustrative arrangements of FIGS. 1-8 and 10, control actuators (e.g., clutch actuators and/or integrated disconnect actuators) of any of the illustrative arrangements and drive systems of FIGS. 1-8, or otherwise manage operation of any of the illustrative arrangements and drive systems of FIGS. 1-8. To illustrate, each of power transfer mechanisms 950 and 960 may include a left side gear train corresponding to a left half shaft and a right side gear train corresponding to a right half shaft.

In some embodiments, control circuitry 916 may include processing equipment, memory, power management components, any other suitable components for controlling one or more drive unit (e.g., front drive unit 914 and rear drive unit 912), or any combination thereof. For example, control circuitry 916 may control current flow (e.g., amount of current and current direction) to phases of an electric motor of one or more drive units (e.g., using electric power as stored in battery pack 930). In a further example, control circuitry 916 may control clutch operation (e.g., using an electromagnetically-actuated clutch) for one or more clutch assemblies. In a further example, control circuitry 916 may control integrated disconnect operation (e.g., using an electromagnetically-actuated differential) in a dual drive unit. In some embodiments, control circuitry 916 is configured to actuate and de-actuate one or more clutch actuators (e.g., a first and second clutch actuator), an integrated disconnect actuator, or a combination thereof. For example, control circuitry may provide control signals (e.g., communications, electric power, or both) to (i) one or more clutch actuators of power transfer mechanism 950, 960, or both, (ii) one or more integrated disconnect actuators of power transfer mechanism 950, 960, or both, and (iii) a combination thereof. In a further example, the control signals may be binary (e.g., on/off application of a DC voltage), analog (e.g., the control signal may be proportional based on a voltage range, pulse-width modulation, or pulse-density modulation), oscillatory (e.g., and AC signal or other oscillating signal), any other suitable waveform or shape (e.g., square wave, sawtooth wave, triangular wave, rectified sinusoidal wave), or any combination thereof. In some embodiments, actuators are spring-loaded or otherwise biased in an engaged or disengaged state, and application of electrical power, hydraulic power, or pneumatic power from vehicle subsystem 910 causes a change in state (e.g., engaged to disengaged, or disengaged to engaged).

In some embodiments, control circuitry 916 may include one or more sensors, one or more sensor interfaces (e.g., for sensors that are included as part of a drive unit), corresponding wiring, corresponding signal conditioning components, any other suitable components for sensing a state of a drive unit, or any combination thereof. For example, control circuitry 916 may include a speed sensor (e.g., a rotary encoder), a current sensor, a voltage sensor, a temperature sensor, any other suitable sensor, or any combination thereof. In some embodiments, control circuitry 916 may be implemented by a central controller, a plurality of distributed control systems, an embedded system, or any combination thereof. For example, control circuitry 916 may be at least partially implemented by an electronic control unit (ECU). In a further example, the electric vehicle may include a power electronics system that is controlled by the ECU and is configured to manage current to one or more electric motors of one or more drive units. Rear drive unit 912 may be coupled to wheels of the electric vehicle by a half shaft, a constant-velocity joint, one or more suspension/steering components, any other suitable coupling, or any suitable combination thereof. Front drive unit 914 may be coupled to wheels of the electric vehicle by a half shaft, a constant-velocity joint, one or more suspension/steering components, any other suitable coupling, or any suitable combination thereof. For example, a wheel may be mounted to a hub that is includes a bearing for a half-shaft, wherein the hub is coupled to suspension/steering components that are mounted to the vehicle frame (e.g., wherein the drive units are also mounted to the vehicle frame).

In some embodiments, a drive system may include a first drive unit and optionally a second drive unit, each including one or more clutch assemblies, and an integrated disconnect assembly. In some embodiments, a system, in addition to including a drive unit (e.g., single or dual), may include processing equipment configured to activate and deactivate the clutch assembly to transfer torque, manage motor operation, manage regeneration (e.g., using the motor as a generator), perform any other control function, or any combination thereof. Activating and deactivating a clutch assembly may refer to completely, or partially, increasing or decreasing the engagement of elements of the clutch assembly (e.g., using control circuitry). For example, activating a clutch assembly may include completely locking the clutch, allowing some slip of the clutch, or otherwise transferring an amount of torque between the output shafts. In some embodiments, the drive unit may include at least one sensor (e.g., coupled to a sensor interface of control circuitry) configured to sense wheel slippage and the control circuitry may be further configured to receive a signal from the at least one sensor, detect that wheel slippage is occurring, and activate a clutch assembly, an integrated disconnect assembly, or a combination thereof in response to detecting that wheel slippage is occurring. For example, a sensor may detect shaft speed (e.g., an output shaft speed, as measured by an encoder) or output torque (e.g., an output shaft torque, or a motor torque). In some embodiments, the drive system may include an accelerator pedal configured to indicate a desired speed (e.g., by being depressed by a user), and the processing equipment may receive a signal from the accelerator pedal, determine a speed parameter based on the signal, and activate one or more clutch assemblies, one or more integrated disconnect assemblies, one or more motors, or a combination thereof, if the speed parameter is above a threshold. For example, if a user "floors" the accelerator pedal (e.g., more than 50% demand), the control circuitry may activate the clutch assemblies or integrated disconnect assembly to lock the output shafts of a drive axis together. In some embodiments, the control circuitry may activate and deactivate a clutch assembly or integrated disconnect assembly based on road conditions (e.g., icy roads, puddles, high winds), a drive mode (e.g., an off-road mode, a sport mode, or a traction mode), any other suitable criterion, or any combination thereof.

In some embodiments, one or more brackets, affixed at one or more locations, may be used to rigidly connect the two motors of the dual drive unit, two power transfer mechanism housings of the dual drive unit, or both, to ensure that all the components of the dual drive unit act as a single rigid body under normal operating conditions. In some embodiments, a boss, a tab, or other suitable feature may be included on a housing to aid in mounting.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. An integrated disconnect arranged within a housing, comprising:
   an output gear having a cavity;
   a torque transfer adapter, arranged within the cavity, that receives a half shaft; and
   a clutch body arranged within the cavity, wherein the clutch body is actuatable through the output gear by an actuator located external to the cavity to engage and disengage the clutch body with the torque transfer adaptor and the torque transfer adapter is configured to receive at least one feature from the clutch body when the clutch body is engaged with the torque transfer adaptor.

2. The integrated disconnect of claim 1, further comprising:
a first bearing arranged laterally displaced from the actuator within a groove in the housing and configured to stabilize rotational motion of the output gear;
a second bearing arranged concentric to a flange on a cover plate affixed to an opening in the output gear that is laterally displaced from the cavity opposite of the groove in the housing; and
the actuator arranged external to the output gear and configured to actuate the clutch body into an engaged position using a clutch arm coupled to the actuator and the clutch body.

3. The integrated disconnect of claim 1, wherein the actuator comprises a solenoid that is coupled to the clutch body and the solenoid is configured to translate the clutch body to at least one of an engaged position and a disengaged position relative to the torque transfer adapter.

4. The integrated disconnect of claim 1, further comprising a sensor arranged external to the output gear and configured to detect a status of the actuator.

5. The integrated disconnect of claim 1, further comprising a sensor arranged to detect a position of the clutch body within the cavity relative to the torque transfer adapter.

6. The integrated disconnect of claim 1, wherein the actuator comprises:
a solenoid configured to modify the clutch body position to an engaged position such that the clutch body is interfacing with the torque transfer adapter; and
a return mechanism affixed to the clutch body such that the return mechanism is configured to modify the clutch body position to a disengaged position such that the clutch body is separate from the torque transfer adapter.

7. A vehicle powertrain, comprising:
a motor; and
a drive unit coupled to the motor, the drive unit comprising:
an integrated disconnect arranged within a housing, comprising:
an output gear having a cavity;
a torque transfer adapter, arranged within the cavity, that receives a half shaft; and
a clutch body arranged within the cavity, wherein the clutch body is actuatable through the output gear by an actuator located external to the cavity to engage and disengage the clutch body with the torque transfer adaptor and the torque transfer adapter is configured to receive at least one feature from the clutch body when the clutch body is engaged with the torque transfer adaptor.

8. The vehicle powertrain of claim 7, further comprising:
a first bearing arranged laterally displaced from the actuator within a groove in the housing and configured to stabilize rotational motion of the output gear;
a second bearing arranged concentric to a flange on a cover plate affixed to an opening in the output gear that is laterally displaced from the cavity opposite of the groove in the housing; and
the actuator arranged external to the output gear and configured to actuate the clutch body into an engaged position using a clutch arm coupled to the actuator and the clutch body.

9. The vehicle powertrain of claim 7, further comprising a sensor arranged to detect a position of the clutch body within the cavity relative to the torque transfer adapter.

10. The vehicle powertrain of claim 7, wherein the clutch body is coupled to the actuator, wherein the actuator comprises:
a solenoid configured to modify the clutch body position to an engaged position such that the clutch body is interfacing with the torque transfer adapter; and
a return mechanism affixed to the clutch body such that the return mechanism is configured to modify the clutch body position to a disengaged position such that the clutch body is separate from the torque transfer adapter.

11. A dual integrated disconnect, comprising:
a first output gear having a first cavity;
a first torque transfer adapter arranged within the first cavity;
a second output gear having a second cavity arranged such that the second cavity opposes the first cavity;
a second torque transfer adapter arranged within the second cavity; and
a clutch assembly arranged between the first torque transfer adapter and the second torque transfer adapter, wherein the clutch assembly is configured to actuate, separately or simultaneously, a clutch body to engage the first torque transfer adapter through the first output gear and a clutch body to engage the second torque transfer adapter through the second output gear.

12. The integrated disconnect of claim 11, further comprising:
a housing structured to enclose the first output gear and the second output gear;
a first bearing arranged in a first groove in the housing and configured to stabilize rotational motion of the first output gear;
a second bearing arranged around flanges extending from a in the housing and configured to stabilize rotational motion of the second output gear; and
the actuator arranged such that a majority of the actuator is external to the housing, wherein the actuator is configured to translate the first torque transfer adapter to a first engaged position, and wherein the actuator is further configured to translate the second torque transfer adapter to a second engaged position.

13. The integrated disconnect of claim 11, wherein the clutch assembly comprises:
a first feature configured to interfaces with the first torque transfer adapter; and
a second feature configured to interface with the second torque transfer adapter.

14. The integrated disconnect of claim 11, wherein:
the first torque transfer adapter is configured to receive a first feature from the clutch assembly when the clutch assembly is actuated to move the first torque transfer adapter into a first engaged position; and
the second torque transfer adapter is configured to receive a second feature from the clutch assembly when the clutch assembly is actuated to move the first torque transfer adapter into a second engaged position.

15. The integrated disconnect of claim 11, wherein the actuator comprises a solenoid.

16. The integrated disconnect of claim 11, further comprising:
a first sensor arranged external to the first output gear and communicably coupled to the actuator;

a second sensor arranged external to the second output gear and communicably coupled to the actuator; and wherein at least a portion of the actuator interfaces with the clutch assembly such that the first sensor and the second sensor are communicably coupled to the portion of the actuator that interfaces with the clutch assembly enabling the first sensor and the second sensor to detect a position of the clutch assembly within the cavity relative to the first torque transfer adapter and the second torque transfer adapter.

17. The integrated disconnect of claim 11, wherein the clutch assembly comprises:

a first extension affixed to the actuator at a first end, affixed to the first torque transfer adapter at a second end, and communicably coupled to a first sensor;

a second extension affixed to the actuator at a third end, affixed to the second torque transfer adapter at a fourth end, and communicably coupled to a second sensor; and a processor configured to receive data transmitted from the first sensor and the second sensor and convert the data transmitted into a position status for each of the first extension and the second extension.

18. The integrated disconnect of claim 11, wherein the actuator comprises:

a solenoid configured to modify the clutch assembly position to a first engaged position with between a first portion of the clutch assembly and the first torque transfer adapter, wherein the solenoid is further configured to modify the clutch assembly position to a second engaged position between a second portion of the clutch assembly and the second torque transfer adapter; and a return mechanism affixed to the clutch assembly such that the return mechanism is configured to modify a current clutch assembly position to a disengaged position such that the clutch assembly is separate from both the first torque transfer adapter and the second torque transfer adapter.

\* \* \* \* \*